United States Patent
Dong et al.

(10) Patent No.: US 9,189,738 B2
(45) Date of Patent: Nov. 17, 2015

(54) AUTOMATIC EVENT ANALYSIS

(71) Applicant: International Business Machines Corporation, Armonk, NY (US)

(72) Inventors: Wei S. Dong, Beijing (CN); Ning Duan, Beijing (CN); Ronald Fellows, Preston (GB); Li Li, Beijing (CN); Wei Sun, Beijing (CN); Zhi H. Wang, Beijing (CN); Changjin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 13/895,714

(22) Filed: May 16, 2013

(65) Prior Publication Data

US 2014/0006324 A1    Jan. 2, 2014

(30) Foreign Application Priority Data

Jun. 29, 2012   (CN) .......................... 2012 1 0225695

(51) Int. Cl.
  *G06F 1/00*   (2006.01)
  *G06N 5/00*   (2006.01)
  *G06N 5/02*   (2006.01)

(52) U.S. Cl.
  CPC ........................................ *G06N 5/02* (2013.01)

(58) Field of Classification Search
  CPC ......... G06N 3/049; G06N 3/08; G06N 3/063; G06N 3/10
  See application file for complete search history.

(56) References Cited

U.S. PATENT DOCUMENTS

| 2003/0158795 A1* | 8/2003 | Markham et al. ................ 705/28 |
| 2006/0007308 A1* | 1/2006 | Ide et al. ........................ 348/143 |
| 2010/0198609 A1 | 8/2010 | Mellin et al. |

FOREIGN PATENT DOCUMENTS

| CN | 103514506 A | 1/2014 |
| WO | 2011006196 | 1/2011 |

* cited by examiner

*Primary Examiner* — Jeffrey A Gaffin
*Assistant Examiner* — Kalpana Bharadwaj
(74) *Attorney, Agent, or Firm* — L. Jeffrey Kelly; Vazken A. Alexanian

(57) ABSTRACT

Embodiments of the present invention relate to a method and system for automatic event analysis. In particular, according to embodiments of the present invention, there is disclosed a method for automatic event analysis, comprising: collecting information on events of a predetermined type occurring at, within a period of time, at least one location in a space; determining a predictability of the events of the predetermined type with respect to the at least one location based on the collected information and a predetermined condition(s) related to the events of the predetermined type; and determining the stability of predictable events with respect to the at least one location within the period of time. Further, there is disclosed a corresponding system. According to embodiments of the present invention, it is possible to classify an event associated with a service and analyze the service demands in a more efficient way.

20 Claims, 4 Drawing Sheets

AUTOMATIC EVENT ANALYSIS

The present application claims the benefit of priority of Chinese Patent Application Serial Number 201210225695.4, entitled "AUTOMATIC EVENT ANALYSIS", filed Jun. 29, 2012 with the State Intellectual Property Office (SIPO) of the People's Republic of China, the contents of which are incorporated by reference herein in its entirety.

TECHNICAL FIELD

Embodiments of the present invention generally relate to the field of data analysis, and more specifically, to a method and system for automatic event analysis.

BACKGROUND

For lots of services in information, data, telecommunications and/or traditional non-information fields, the accurate estimation and analysis of service demands are of vital importance. In particular, many services are spatially distributed, such as mobile communication services, network services, etc. For such services, how to accurately analyze and predict service demands at different locations and/or different moments plays a significant role in the allocation and planning of service resources, for example.

Consider mobile communication services as an example. In a wireless communication network formed by cells, the service capacity (e.g., coverage scope, the number of mobile terminals that can be processed, etc.) of each local access point (AP) is typically limited. It depends on the service demand prediction to a great extent regarding how and what access points are disposed at various locations of the wireless network and how these access points are activated or deactivated at different periods of time. Specifically, if it is possible to determine by analysis that a service demanded at a certain location is obviously higher than those at other locations, then it is possible to accordingly adjust the number of deployed APs, the type thereof, and/or the service capacity, etc.

Known service demand analysis includes statistics of service situation at various locations in a space where services are distributed. Based on the statistical information, it is possible to analyze the service demand situation at each location. However, according to the prior art, an event triggering a service is always assumed to be predictable in the demand analysis of spatially distributed services. Hence, different characteristics and different aspects of such events are not fully considered in the service analysis and subsequent optimization. Besides, spatial heterogeneity in the worst case scenarios is difficult to estimate according to known demand analysis schemes. Sharing of flexible resources (e.g., temporal resources) is also difficult. Moreover, known demand event analysis schemes fail to integrate the fact that demands vary with the location and time. Therefore, the location-based demand statistics and analysis will not be efficiently updated or changed with time.

SUMMARY OF THE INVENTION

In view of the foregoing problems in the prior art, there is a need in the art for a more efficient technical solution to automatic event analysis. To this end, embodiments of the present invention provide a method and system for analyzing demand events of spatially distributed services.

In one aspect of the present invention, there is provided a method for automatic event analysis. The method comprises: collecting information on events of a predetermined type occurring at at least one location in a space, within a period of time; determining a predictability of the events of the predetermined type with respect to the at least one location based on the collected information and predetermined condition(s) related to the events of the predetermined type; and determining a stability of predictable events with respect to the at least one location within the period of time.

In another aspect of the present invention, there is provided a system for automatic event analysis. The system comprises: an information collecting unit, configured to collect information on events of a predetermined type occurring at, within a period of time, at least one location; a predictability determining unit, configured to determine a predictability of the events of the predetermined type with respect to the at least one location based on the collected information and predetermined condition(s) related to the events of the predetermined type; and a stability determining unit, configured to determine the stability of predictable events with respect to the at least one location within the period of time.

It will be appreciated from the following description that, by use of embodiments of the method and system according to the present invention, events associated with a service may be classified as predictable events and unpredictable events with respect to one or more spatial locations of interest. Further, predictable events may be classified as stable event and dynamic events based on a time dimension.

Through such a two-stage classification of events, different locations in a space and time factors may be taken into consideration of the demand analysis. Thus, it is possible to better analyze characteristics at space and time dimensions of an event triggering a service, determine a service demand pattern and thus achieve more reasonable and efficient arrangement and scheduling of services.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in embodiments of the present disclosure.

Throughout the drawings, same or similar reference signs are used to refer to same or similar elements.

DETAILED DESCRIPTION OF EMBODIMENTS

The principles and spirit of the present invention will be described with reference to several exemplary embodiments shown in the accompanying drawings. It is to be understood that these embodiments are provided to enable those skilled in the art to better understand and further implement the idea of the present invention, rather than for limiting the scope of the present invention in any way.

Figure 1:
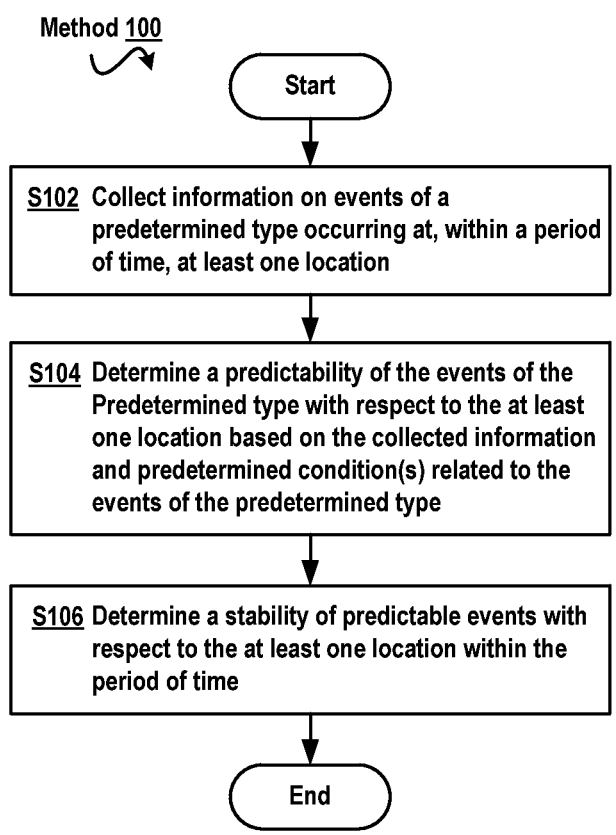
FIG. 1 shows a flowchart of a method 100 for automatic event analysis according to one exemplary embodiment of the present invention.

With reference to FIG. 1 first, this figure shows a flowchart of a method 100 for automatic event analysis according to one exemplary embodiment of the present invention.

After the method 100 starts, at step S102 information on events of a predetermined type that occurs at, within a given period of time, at least one location in a space is collected.

According to embodiments of the present invention, events of any predetermined types that are to be analyzed may be associated with a specific service. The term "service" used herein may represent various types of services. For example, the services may include information technology services, such as network services, mobile communication services, data services, etc. Alternatively or additionally, the services may also be non-pure information services, such as medical aid, emergency treatment, automotive rescue, accident response, etc. The scope of the present invention is not limited in this regard.

Each service may be associated with events of one or more specific types. Upon occurrence of an event of these types, a demand for an associated service is put forward, i.e., this service is required to be provided. For example, upon occurrence of an event of such a type that a user sends a network data request by using his/her electronic device, a corresponding network node is required to provide an associated network information service. At this point, the network service is associated with the user request event. For another example, upon occurrence of a criminal event, a corresponding emergency treatment service (e.g., dispatching police and/or medical personnel to the location) is required to be provided. At this point, the criminal event is associated with the emergency treatment service. However, they are several examples only.

As described above, typically it is necessary to provide services at different locations scattered in a space. In other words, an event associated with a service might occur at more than one location in a space. At step S102, it is possible to collect information on events of a specific type that occur at, within a given period of time, at least one location in a space. Here, the given period of time may be, for example, day, month, season, year and other proper time unit, which varies with a concrete application scenario and demand.

According to some embodiments, the collected information may include, for example, description of events of this type and the occurrence location, e.g., including the number of occurrences of events at a specific location, occurrence date, occurrence time, geographic coordinates (e.g., latitude/longitude coordinates) of the location, description of the location (e.g., block), event type (e.g., a user sends a request, a criminal event occurs, etc.). They are only several examples, and any other information on events fall within the scope of the present invention.

According to embodiments of the present invention, the information on the events of a specific type may be organized and transmitted in any proper format. For example, the information may be organized as a formatted structure, such as a table or an extensible markup language (XML) file. For another example, the information may also be organized and transmitted using unstructured format, e.g., a text file. The scope of the present invention is not limited in this regard.

According to embodiments of the present invention, the information may be collected using various proper means. For example, appropriate sensors may be used to monitor the occurrence of events of a predetermined type and collect relevant information. Alternatively or additionally, the information on an event may be inputted manually or half-manually. The scope of the present invention is not limited in this regard.

In addition, the information may be transferred to a collection point from various locations in the space by various appropriate communication means. For example, various wired and/or wireless network communication technologies and/or communication technologies may be used. For example, Bluetooth, infrared and other communication between devices also apply to embodiments of the present invention. Note that according to embodiments of the present invention, the event information from different locations may be collected to any proper entity that is capable of information processing and treating, e.g., a computer system to be described with reference to FIG. 4.

Next, the method 100 proceeds to step S104 where the predictability of the events of a specific type with respect to the at least one location is determined based on the information collected at step S102 and predetermined condition(s) related to the specific event type.

The term "predictability" used herein refers to an extent to which an event of the specific type is predictable. According to embodiments of the present invention, predictability may be measured by the strength or close degree of a correlation between the event of the specific type and a set of predetermined conditions.

More specifically, there may be a set of predetermined conditions related to the occurrence of an event, according to embodiments of the present invention. This set of predetermined conditions may be, for example, derived from statistics on the same kind of events that occurred previously. For example, if statistics on previous events show that events that the user uses his/her mobile device to access data usually occurs from 12:00 to 14:00 and at locations such as restaurants and malls, then predetermined conditions related to events of the type "mobile data access" may include a time condition "from 12:00 to 14:00" and an environmental condition "restaurants, malls." For another example, if statistics show that criminal events usually occur from 23:00 to 1:00 and near entertainment places and banks, then predetermined occurrence conditions related to events of the type "crime" may also be established accordingly.

In addition to being based on statistical information or alternatively, the predetermined condition may be received from the user. In a word, the event-related predetermined condition may be determined by any proper technical means, and the scope of the present invention is not limited in this regard.

Note that the time and environmental factors enumerated above are merely examples of the event-related predetermined condition. Various factors related to the event occurrence may be included to statistics and recorded as predetermined conditions. Moreover, these predetermined conditions may vary with time, e.g., increasing or decreasing. The scope of the present invention is not limited in this regard.

In particular, it is to be understood that according to embodiments of the present invention, the information on the events occurring at least one location as collected at step S102 at least includes information items corresponding to each predetermined condition. For example, if the condition contains $A_1, A_2, \ldots A_N$, then the collected information at least should contain description of $A_1, A_2, \ldots A_N$. Of course, the collected information may contain more additional information.

Continue the discussion on step S104. According to embodiments of the present invention, the close degree of the correlation between the events of the specific type and the set of predetermined conditions, i.e., the predictability of the events of the specific type with respect to location, may be determined using any proper means and based on the collected information and the predetermined conditions. As an example, when an event occurs at a specific location, it is possible to determine the number or ratio of satisfied conditions among the predetermined conditions. Considering a specific example, suppose there are N event-related predetermined occurrence conditions, wherein N is a natural number. For an event occurring at a specific location, it is possible to determine, based on the collected event information, how many conditions among the N conditions are satisfied upon occurrence of the event.

On one hand, if a value of M (M is a natural number less than N), the number of satisfied conditions, or the ratio of M to N exceeds a predetermined threshold, then it may be recognized that the occurrence of this event at this location conforms to priori knowledge about event occurrence conditions. Hence, the occurrence of the event at this location may be classified as predictable. That is, at this specific location the service-associated event is a "predictable event."

On the other hand, if a value of M or the ratio of M to N does not exceed the predetermined threshold, then it may be recognized that the occurrence of the service-associated event at this location is accidental or unpredictable. That is, at this specific location the service-associated event is an "unpredictable event."

As a specific example, still suppose the predetermined conditions related to the event "mobile data access" includes a time condition "from 12:00 to 14:00" and an environmental condition "restaurants or malls." If the event "mobile data access" occurs at place A, whereas it is determined from the collected event information that the period of time is not 12:00 to 14:00 and there is no restaurant or mall near place A, then it may be recognized that the event "mobile data access" is accidental with respect to place A. That is, the event is an unpredictable event with respect to place A.

Note that the above-described determining the predictability of the event with respect to location based on the number of satisfied predetermined conditions is merely an example. It is to be understood that this embodiment may be deemed to operate based on predetermined rules. There are other alternative or additional embodiments. For example, any other proper means may be used in conjunction with embodiments of the present invention. Such rules may be set according to priori knowledge for example, and/or received from the user. The scope of the present invention is not limited in this regard.

In addition to this rule-based predictability determining scheme or alternatively, according to embodiments of the present invention, it is possible to dig into the internal dependence between the event and the predetermined condition and to determine, based on to the dependence, the predictability of the event with respect to the at least one location in the space. For example, in some exemplary embodiments, a predictive model may be used to determine the dependence between the predetermined condition and the event occurring at the at least one location in the space. As an example, a regression model and regression analysis technology may be used to determine the dependence between the event and the predetermined condition. As appreciated by those skilled in the art, the regression model and regression analysis may be used to determine the strength of the dependence between two sets of variables. Such an embodiment will be described in detail with reference to FIG. 2.

In addition to the regression predictive model, other kinds of statistical models (e.g., an implicit Markov model), neural networks and other predictive models may be used in conjunction with embodiments of the present invention, for determining the dependence between the predetermined condition and the event occurring at a specific location based on the information describing the event. In fact, any predictive model that is currently known or to be developed in future may be used for deciding the dependence between a set of predetermined conditions and the event occurring at a specific location. The scope of the present invention is not limited in this regard.

By performing steps S102 and S104, for the at least one location in the space, events of each specific type may be divided into two groups: events that are predictable with respect to the occurrence location, and events that are unpredictable with respect to the occurrence location. It is to be understood that for events unpredictable with respect to a location, their occurrence at this location has a stronger chance. On the contrary, for events predictable with respect to a location, their occurrence at this location has a stronger necessity. Such classification helps to better analyze service demands and thereby better allocate and/or schedule service resources.

Next, the method 100 proceeds to further classify predictable events with respect to the specific location. Specifically, as shown in FIG. 1, the method 100 proceeds to step S106 where the stability of predictable events with respect to the at least one location within the given period of time is determined.

To this end, according to some embodiments, at step S106 the given period of time may be divided into a plurality of time slices, and based on the distribution of predictable events with respect to the at least one location at these time slices, the stability of the events within the given period of time is determined.

Specifically, the given period of time may be evenly or unevenly divided into a plurality of sub-periods of time each of which is called a time slice. For example, if the period of time within which the event information is collected is one year, then at step S106 the period of time may be divided into 4 time slices based on the unit of season. Afterwards, for predictable events with respect to a specific location, it may be determined whether the predictable events are uniformly distributed in the 4 time slices. Generally speaking, the more uniform the distribution of an event in different time slices, the higher stability of the event within the given period of time.

In particular, if the frequencies that the predictable events occurs at a specific location in the 4 time slices are substantially equal, then it may be recognized that this event is not only predictable at this location but also stable within the given period of time (one year in this example). On the contrary, if it is found that the occurrences of the event at the location are concentrated in some of the time slices while the event seldom or almost does not occur in others, then it may be recognized that the event is unstable or dynamic within the given period of time.

According to some optional embodiments, at step S106 it is possible to only determine the stability of those frequently-occurring predictable events within the given period of time. First of all, the frequency (e.g., the number) that predictable events occurs at a specific location in each of the time slices is calculated. Then, in each of the time slices the calculated frequency is compared with a predetermined threshold to screen the events. That is, in each of the time slices only those predictable events whose occurrence frequencies are larger than the predetermined threshold are selected out, while other predictable events are excluded from subsequent processing. Then, frequencies of the predictable events selected out are compared across time slices, so as to determine the stability of the predictable events selected out with respect to time. For example, if predictable events selected out is present in time slices that are more than a predetermined number, then it may be recognized that the event is stable within the given period of time. Otherwise, the predictable events will be classified as a dynamic event.

The method 100 ends after step S106.

So far the method 100 has completed a more efficient and meaningful automatic analysis of an event (e.g., an event associated with a specific service). The results of such an automatic analysis may be used by a relevant party in various manners. For example, resources of the service associated with the event may be scheduled based on the analysis result of the event. It is to be understood that the analysis results of the event comprise whether one or more types of events are predictable and whether predictable events are stable within a given period of time. By means of these results resources may be scheduled more reasonably for an associated service. For example, service resources may be scheduled, giving priority to predictable events. Further, among predictable events, scheduling of service resources may give priority to stable events. A concrete example will be given below in this regard. However, it is to be understood that the method 100 according to embodiments of the present invention serves a main purpose of solving the problem of automatically analyzing and classifying events, and how to use analysis results may be determined flexibly according to actual situation. Therefore, the use of analysis results is not essential to the method 100 and also does not limit the scope of the present invention.

Consider a concrete example. As described above, by implementing the embodiment of the method 100, the events associated with spatially-distributed services may be first classified as predictable events and unpredictable events with respect to one or more locations of interest in the space. It is to be understood that the occurrence of predictable events has a stronger necessity, while the occurrence of unpredictable events has a stronger chance. When scheduling and allocating service resources, for example, priority may be given to those locations where events are predictable. For example, if an analysis suggests that the event "mobile data access" is predictable with respect to conditions "from 12:00 to 14:00" (time condition) and "restaurants, malls" (environmental condition), then more access points may be disposed at restaurants and malls, and these access points are arranged to operate at a higher level (e.g., increase the transceiver power, etc.) from 12:00 to 14:00.

For predictable events with respect to a given location, they may be further divided into stable events and dynamic events. For temporally stable predictable events, corresponding service resources may be scheduled and allocated with priority within the given period of time. On the contrary, for those unstable predictable events, service resources may be scheduled only in time slices on which their occurrences are concentrated. Still consider the foregoing example about wireless access points. If an event analysis suggests that the predictable events "mobile data access" is stable in a specific period of time only (e.g., specific month(s) or season(s)) but unstable in other periods of time, then the deployment of access point resources may be enhanced within this specific period of time. Alternatively or additionally, if the event "mobile data access" is stable at a first location in a certain area but unstable at a second location in other area, then priority may be given to the deployment of wireless access resources and infrastructure at this first location.

According to embodiments of the present invention, by classifying events in two phases, service demands may be better analyzed and service resources scheduled and allocated more reasonably and efficiently, as compared with the prior art.

Note that the order of respective steps as described above in conjunction with FIG. 1 is merely exemplary. For example, at step S102 after event information is received, an event may be assigned to a group based on time slices. At this point, at step S104 the predictability of each event with respect to its occurrence location may be determined with the unit of each of the time slices. In other words, time slices involved at step S106 may be performed at step S102. Other adjustment to the order of execution is also possible. In particular, parallel execution is also possible. For example, at step S106 operations in respective time slices may be at least partially executed in parallel. The scope of the present invention is not limited.

Figure 2:
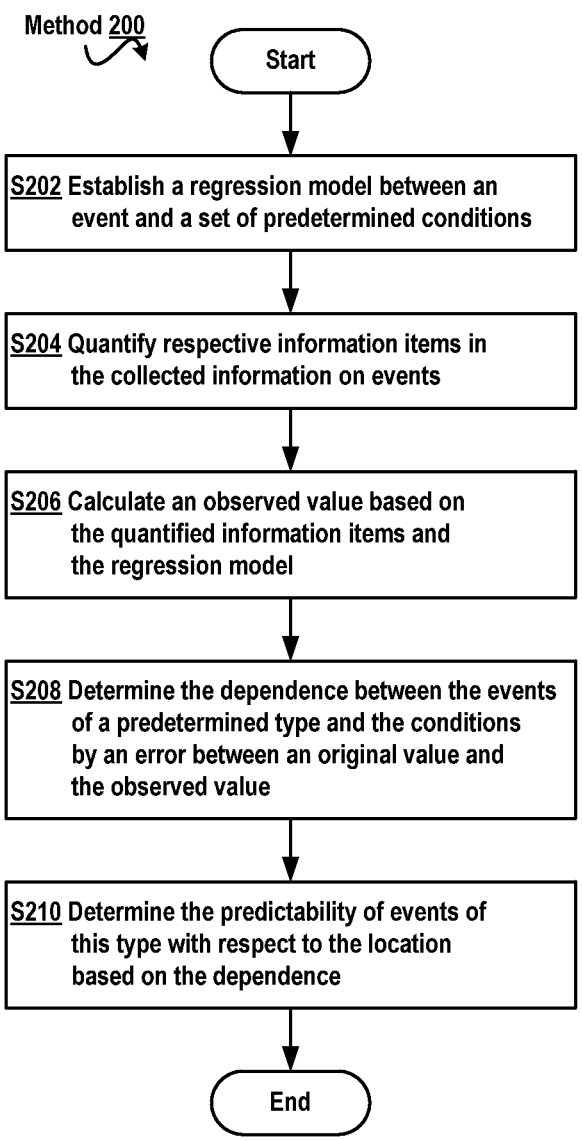
FIG. 2 shows a flowchart of a method 200 for deriving the dependence between an event and predetermined condition(s) according to a predictive model so as to determine the predictability of the event according to one exemplary embodiment of the present invention.

As mentioned in the description of step S104 with reference to FIG. 1, it is possible to determine the dependence between an event and a predetermined condition based on a predictive model, so as to determine the dependence between them. FIG. 2 describes one embodiment in this regard. This figure shows a flowchart of a method 200 for deriving the dependence between an event and a predetermined condition based on a predictive model so as to determine the predictability of the event according to one exemplary embodiment of the present invention. In particular, the dependence may be determined using a regression model in the method 200.

After the method 200 starts, a regression predictive model between an event and predetermined condition(s) of the event is established at step S202. For example, suppose the condition related to the event occurrence comprises $A_1, A_2 \ldots A_N$. As is well known in the art, a regression model expressed by the following equation may be constructed:

$$Y = a_1 \cdot X_1 + a_2 \cdot X_2 + \ldots + a_N \cdot X_N$$

In the equation, $X_1, X_2 \ldots X_N$ are quantified observed values of conditions $A_1, A_2 \ldots A_N$, respectively, and they may be obtained by collecting and making statistics on historical data, for example. $a_1, a_2 \ldots a_N$ represent to-be-solved parameters or are called "regression coefficients." Y is an observed value of occurrences of the events of the specific type at a specific location or is called an original value. Regression coefficients $a_1, a_2 \ldots a_N$ may be obtained from the equation, whereby a regression model is built. This is known to those skilled in the art.

According to embodiments of the present invention, predetermined conditions $A_1, A_2 \ldots A_N$ may be quantified according to any proper rules and policies, whereby $X_1, X_2 \ldots X_N$ are obtained. For example, regarding a predetermined condition expressed by a value, a quantified value may be determined directly based on the value; regarding a predetermined condition expressed by descriptive information, a value may be assigned to corresponding description by using any proper scheme (for example, "1" is assigned to "malls," "2" is assigned to "restaurants," etc.). Therefore, the regression model characterizes a statistical association between an event occurrence and a predetermined condition affecting the event occurrence.

Note that various regression models that are currently known or to be developed in future may be used at step S202. Alternatively or additionally, other predictive models may be used, such as implicit Markov models, neural networks, etc. The scope of the present invention is not limited in this regard.

In addition, it is to be understood that according to some embodiments, as historical data is accumulated, step S202 may be performed repeatedly so as to continuously update regression coefficients $a_1, a_2 \ldots a_N$.

Next at step S204, information items contained in the collected information on the events of the predetermined type occurring at at least one location in a space are quantified as $x_1, x_2 \ldots x_N$. As described above, a scheme that is the same as or similar to the predetermined condition may be used to assign a value to each information item, thereby obtaining quantified information items $x_1, x_2 \ldots x_N$.

Later, the method 200 proceeds to step S206 where the quantified information items substitute into the regression model to calculate a predicted value y of occurrences of the events of the predetermined type at the specific location being considered:

$$y = a_1 x_1 + a_2 x_2 + \ldots + a_N x_N$$

At step S208, the original value Y is compared with the observed value y to calculate an error $\epsilon = Y - y$. As is clear from the definition to the regression model, the error $\epsilon$ reflects the dependence between the predetermined condition and the event occurring at the specification location. If the error $\epsilon$ is less than a predetermined threshold, then the dependence between the predetermined condition and the event occurring at the specification location is relatively strong. On the contrary, if the error $\epsilon$ is more than the predetermined threshold, then the dependence between the predetermined condition and the event occurring at the specification location is relatively weak.

Finally at step S210, the event may be classified as predictable events or an unpredictable event with respect to its occurrence location, based on the dependence. This is similar to the description when taken conjunction with FIG. 1, which is not detailed here accordingly.

The method 200 ends after step S210.

Unlike the embodiment, described with reference to FIG. 1, of determining the predictability of an event with respect to a location based on simple rules, by implementing the embodiment of the method 200, it is possible to use the regression predictive model and regression analysis to more inclusively and accurately characterize and calculate the dependence between the predetermined condition and the event occurring at the specific location, so as to determine the predictability.

Figure 3:
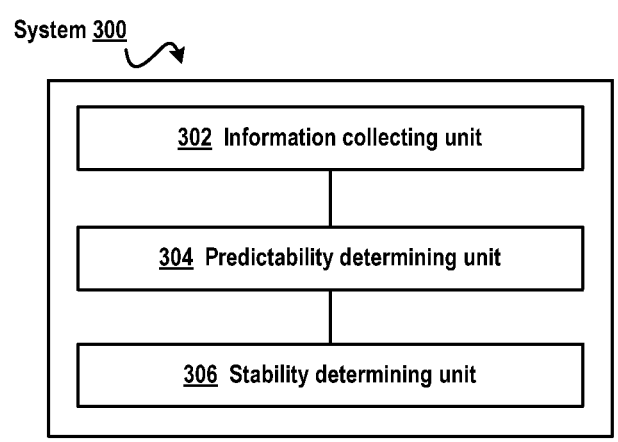
FIG. 3 shows a block diagram of a system 300 for automatic event analysis according to one exemplary embodiment of the present invention.

With reference now to FIG. 3, this figure shows a block diagram of a system 300 for analyzing service demands according to one exemplary embodiment of the present invention. It is to be understood that the embodiment of the system 300 may reside in, for example, an entity for collecting event information in a space.

As shown in FIG. 3, according to the embodiment of the present invention, the system 300 comprises: an information collecting unit 302 configured to collect information on events of a predetermined type occurring at, within a given period of time, at least one location; a predictability determining unit 304 configured to determine a predictability of the events of the predetermined type with respect to the at least one location based on the collected information and a predetermined condition related to the events of the predetermined type; and a stability determining unit 306 configured to determine the stability of predictable events within the period of time with respect to the at least one location.

According to some embodiments of the present invention, the predictability determining unit 304 may comprise: a dependence analyzing unit, configured to analyze the information so as to determine the dependence between the predetermined condition and the events of predetermined type occurring at the at least one location; and a first predictability determining unit, configured to determine a predictability of the events of the predetermined type with respect to the at least one location based on the dependence.

According to some embodiments of the present invention, the dependence analyzing unit comprises: a model-based dependence analyzing unit, configured to determine, based on a predictive model, the dependence between the predetermined condition and the events of the predetermined type occurring at the at least one location.

According to some embodiments of the present invention, the predictive model comprises one of a regression model, a statistical model and a neural network.

According to some embodiments of the present invention, the stability determining unit 306 may comprise: a time slicing unit, configured to divide the period of time into a plurality of time slices; and a first stability determining unit, configured to determine, based on the distribution of predictable events in the plurality of time slices with respect to the at least one location, the stability of the predictable events within the period of time.

According to some embodiments of the present invention, the first stability determining unit comprises: a frequency calculating unit, configured to calculate a frequency of the predictable events in each of the time slices; a selecting unit, configured to, in each of the time slices, compare the frequency with a predetermined threshold so as to select a predictable event whose frequency is larger than the predetermined threshold; and a comparing unit, configured to, across the plurality of time slices, compare the frequencies of the selected predictable event so as to determine the stability of the selected predictable event within the period of time.

According to some embodiments of the present invention, the system 300 may comprise an optional resource scheduling unit (not shown) configured to schedule resources for a service associated with the event based on a result of the analysis for the event. An example of resource scheduling is to dynamically schedule the deployment and configuration of access points APs according to wireless access demands of users.

It is to be understood that the respective units and optional sub-units comprised in the system 300 described with reference to FIG. 3 correspond to the respective steps of the methods 100 and 200 described with reference to FIGS. 1 and 2. Thus, all the features and operations described for the methods 100 and 200 are also applicable to the system 300, which are not detailed here.

In particular, the division of the units and optional sub-units of the system 300 is not limiting but exemplary. For example, the function of a single unit shown in FIG. 3 may be performed by a plurality of units. Instead, a plurality of units shown in this figure may be implemented by a single one. The scope of the present invention is not limited in this regard.

It is to be further understood that the unit and sub-unit comprised in the system 300 may be implemented in various forms, including software, hardware, firmware or any combination thereof. For example, in some embodiments each unit of the system 300 may be implemented using software and/or firmware modules. Alternatively or additionally, the unit of the system 300 may be implemented using hardware modules. For example, each unit of the system 300 may be implemented as an integrated circuit (IC) chip or application-specific integrated circuit (ASIC). Each unit of the system 300 may also be implemented as a system on chip (SOC). Other forms that are currently known or to be developed in future are also feasible. The scope of the present invention is not limited in this regard.

Figure 4:
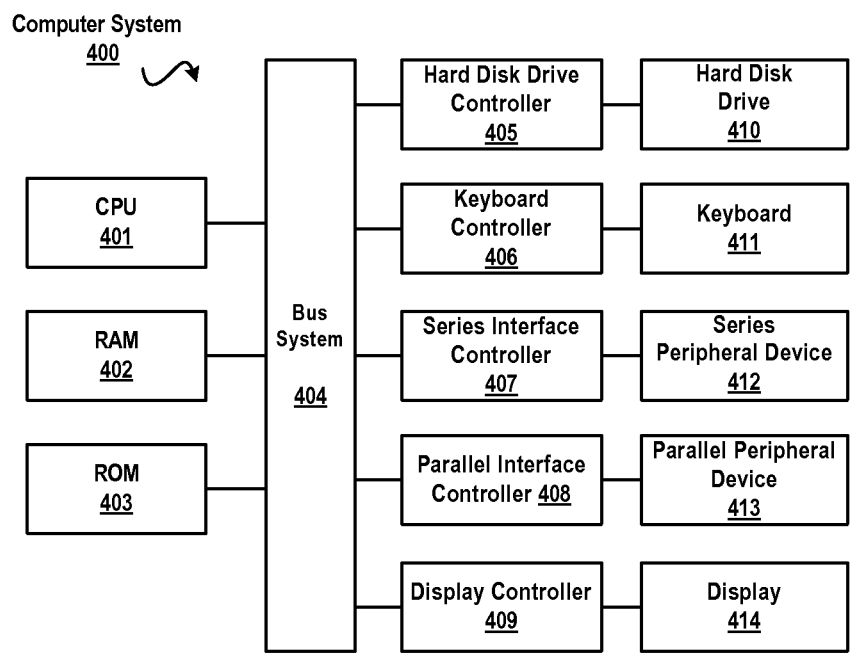
FIG. 4 shows an exemplary computer system 400 which is applicable to implement embodiments of the present invention.

With reference to FIG. 4, this figure shows an exemplary computer system 400 which is applicable to implement embodiments of the present invention. As shown in FIG. 4, the computer system 400 may include: CPU (Central Process Unit) 401, RAM (Random Access Memory) 402, ROM (Read Only Memory) 403, System Bus 404, Hard Drive Controller 405, Keyboard Controller 406, Serial Interface Controller 407, Parallel Interface Controller 408, Display Controller 409, Hard Drive 410, Keyboard 411, Serial Peripheral Equipment 412, Parallel Peripheral Equipment 413 and Display 414. Among above devices, CPU 401, RAM 402, ROM 403, Hard Drive Controller 405, Keyboard Controller 406, Serial Interface Controller 407, Parallel Interface Controller 408 and Display Controller 409 are coupled to the System Bus 404. Hard Drive 410 is coupled to Hard Drive Controller 405. Keyboard 411 is coupled to Keyboard Controller 406. Serial Peripheral Equipment 412 is coupled to Serial Interface Controller 407. Parallel Peripheral Equipment 413 is coupled to Parallel Interface Controller 408. And, Display 414 is coupled to Display Controller 409. It should be understood that the structure as shown in FIG. 4 is only for the exemplary purpose rather than any limitation to the present invention. In some cases, some devices may be added to or removed from the computer system 400 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

What is claimed is:

1. A method for automatic event analysis, the method comprising:
   collecting information on events associated with a specific service, the events occurring at a location, within a period of time;
   determining a predictability of the events with respect to the location based on the collected information and at least one predetermined condition related to the events;
   determining a stability of predictable events with respect to the location within the period of time, wherein the predictable events are events for which the predictability exceeds a predetermined predictability threshold; and
   scheduling resources for the specific service associated with the events based on the predictability of the events and the stability of the predictable events, wherein the more uniform the event distribution, the higher the stability.

2. The method according to claim 1, wherein determining the predictability of the events comprises:
   analyzing the collected information to determine a dependence between the at least one predetermined condition and the events occurring at the location; and
   determining the predictability of the events with respect to the location based on the dependence.

3. The method according to claim 2, wherein analyzing the collected information comprises:
   determining the dependence between the at least one predetermined condition and the events occurring at the location based on a predictive model.

4. The method according to claim 3, wherein the predictive model includes one of a regression model, a statistical model and a neural network.

5. The method according to claim 1, wherein determining the stability of the predictable events comprises:
   slicing the period of time into a plurality of time slices; and
   determining the stability of the predictable events within the period of time based on a distribution of the predictable events with respect to the location in the plurality of time slices.

6. The method according to claim 5, wherein determining the stability of the predictable events within the period of time based on the distribution of the predictable events with respect to the location in the plurality of time slices comprises:
   calculating a frequency of the predictable events in each of the plurality of time slices;
   comparing the frequency of the predictable events in each of the plurality of time slices with a predetermined frequency threshold to select a predictable event for which the frequency is larger than the predetermined frequency threshold; and
   comparing frequencies of the selected predictable event across the plurality of time slices to determine the stability of the selected predictable event within the period of time.

7. A system for automatic event analysis, the system comprising:
   one or more computer processors, one or more non-transitory computer-readable storage media, and program instructions stored on one or more of the computer-readable storage media for execution by at least one of the one or more processors, the program instructions comprising:
   program instructions to collect information on events associated with a specific service, the events occurring at a location, within a period of time;
   program instructions to determine a predictability of the events with respect to the location based on the collected information and at least one predetermined condition related to the events;
   program instructions to determine a stability of predictable events with respect to the location within the period of time, wherein the predictable events are events for which the predictability exceeds a predetermined predictability threshold; and
   program instructions schedule resources for the specific service associated with the events based on the predictability of the events and the stability of the predictable events, wherein the more uniform the event distribution, the higher the stability.

8. The system according to claim 7, wherein the program instructions to determine the predictability of the events comprises:
   program instructions to analyze the collected information to determine a dependence between the at least one predetermined condition and the events occurring at the location; and
   program instructions to determine the predictability of the events with respect to the location based on the dependence.

9. The system according to claim 8, wherein the program instructions to analyze the collected information comprises:
   program instructions to determine the dependence between the at least one predetermined condition and the events occurring at the location based on a predictive model.

10. The system according to claim 9, wherein the predictive model comprises one of a regression model, a statistical model and a neural network.

11. The system according to claim 7, wherein the program instructions to determine the stability of the predictable events comprises:
    program instructions to slice the period of time into a plurality of time slices; and
    program instructions to determine the stability of the predictable events within the period of time based on a distribution of the predictable events with respect to the location in the plurality of time slices.

12. The system according to claim 11, wherein the program instructions to determine the stability of the predictable events within the period of time based on the distribution of the predictable events with respect to the location in the plurality of time slices comprises:
    program instructions to calculate a frequency of the predictable events in each of the plurality of time slices;
    program instructions to compare the frequency of the predictable events in each of the plurality of time slices with a predetermined frequency threshold to select a predictable event for which the frequency is larger than the predetermined frequency threshold; and program instructions to compare frequencies of the selected predictable event across the plurality of time slices to determine the stability of the selected predictable event within the period of time.

13. The method according to claim 1, wherein determining the stability of the predictable events comprises:
    slicing the period of time into a plurality of time slices;
    calculating a frequency of which the predictable events occur at the location in each of the plurality of time slices;
    classifying the predictable events as stable events if their frequency is greater than or equal to a predetermine frequency threshold; and
    classifying the predictable events as dynamic events if their frequency is less than the predetermined frequency threshold.

14. The method according to claim 13, wherein scheduling resources for the specific service associated with the events comprises:
    allocating resources for the specific service associated with stable predictable events with priority to a given time period; and
    allocating resources for the specific service associated with the dynamic events only in time slices in which their occurrences are concentrated.

15. The method of claim 1, wherein scheduling resources for the specific service associated with the events comprises:
    giving priority to the predictable events.

16. The method of claim 13, wherein scheduling resources for the specific service associated with the events comprises:
    giving priority to stable events.

17. The system according to claim 7, wherein the program instructions to determine the stability of the predictable events comprises:
    program instructions to slice the period of time into a plurality of time slices;
    program instructions to calculate a frequency of which the predictable events occur at the location in each of the plurality of time slices;
    program instructions to classify the predictable events as stable events if their frequency is greater than or equal to a predetermine frequency threshold; and
    program instructions to classify the predictable events as dynamic events if their frequency is less than the predetermined frequency threshold.

18. The system according to claim 7, wherein the program instructions to schedule resources for the specific service associated with the events comprises:
    program instructions to allocate resources for the specific service associated with stable predictable events with priority to a given time period; and
    program instructions to allocate resources for the specific service associated with dynamic events only in time slices in which their occurrences are concentrated.

19. The system according to claim 7, wherein the program instructions to schedule resources for the specific service associated with the events comprises:
    program instructions to give priority to the predictable events.

20. A method for automatic event analysis, the method comprising:
    collecting information on events associated with a specific service, the events occurring at a location, within a period of time;
    analyzing the collected information to determine a dependence between at least one predetermined condition and the events occurring at the location;
    determining the predictability of the events with respect to the location based on the dependence;
    slicing the period of time into a plurality of time slices;
    calculating a frequency that predictable events occur at the location in each of the plurality of time slices, wherein the predictable events are events for which the predictability exceeds a predetermined predictability threshold;
    classifying predictable events as stable events if their frequency is greater than or equal to a predetermine frequency;
    classifying predictable events as dynamic events if their frequency is less than the predetermined frequency; and
    scheduling resources for the specific service associated with the events based on the predictability of the events and the stability of the predictable events.

\* \* \* \* \*